United States Patent [19]
Huang et al.

[11] Patent Number: 5,666,350
[45] Date of Patent: Sep. 9, 1997

[54] APPARATUS AND METHOD FOR CODING EXCITATION PARAMETERS IN A VERY LOW BIT RATE VOICE MESSAGING SYSTEM

[75] Inventors: Jian-Cheng Huang, Lake Worth; Xiaojun Li, Boynton Beach; Floyd Simpson, Lantana, all of Fla.

[73] Assignee: Motorola, Inc., Schaumburg, Ill.

[21] Appl. No.: 603,677

[22] Filed: Feb. 20, 1996

[51] Int. Cl.$^6$ .................................................. H04J 3/17
[52] U.S. Cl. .......................... 370/435; 704/203; 704/207; 704/208
[58] Field of Search .............................. 370/81; 395/2.14, 395/2.18, 2.2, 2.23, 2.28, 2.3, 2.31, 2.32, 2.39

[56] References Cited

U.S. PATENT DOCUMENTS

| | | |
|---|---|---|
| 4,076,958 | 2/1978 | Fulgum ................................. 179/1.5 A |
| 5,271,089 | 12/1993 | Ozawa .................................... 395/2.31 |
| 5,473,727 | 12/1995 | Nishiguchi et al. ..................... 395/2.31 |

*Primary Examiner*—Douglas W. Olms
*Assistant Examiner*—Hbdelhamid Bnimoussa
*Attorney, Agent, or Firm*—Gregg Rasor

[57] ABSTRACT

An apparatus codes excitation parameters for very low bit rate voice messaging using a method that processes a voice message to generating speech parameters. The speech parameters are separated (316) to produce a first group of energy parameters and a second group of pitch and voicing parameters. Subsequently, the first group of energy parameters are encoded and compressed using a non-uniform root-mean-square scalar process (318) to create a first plurality of encoded data. Additionally, the second group of pitch and voicing parameters are compressed, encoded, and combined into a single parameter using a three slope vector encoding process (320) that creates a second plurality of encoded data. Finally, the first and second plurality of encoded data are multiplexed (322) to create a multiplexed signal for transmission, the multiplexed signal representing the voice message.

9 Claims, 10 Drawing Sheets

APPARATUS AND METHOD FOR CODING EXCITATION PARAMETERS IN A VERY LOW BIT RATE VOICE MESSAGING SYSTEM

FIELD OF THE INVENTION

This invention relates generally to communication systems, and more specifically to a compressed voice digital communication system which provides a method for compressing selected excitation parameters.

BACKGROUND OF THE INVENTION

In modern communication systems data transmission occurs under a condition of narrow bandwidth. It is therefore highly advantageous to develop methods which allow for data transmission at low bit rates. Various data compression techniques have been developed to assist in accomplishing the goal of low bit rate data transfer. In lieu of sending the input speech itself, the speech is analyzed to determine its parameters such as, pitch, spectrum, energy and voicing and these parameters are transmitted. The receiver then uses these parameters to synthesize an intelligible replica of the input speech.

Adding to the difficulty in low bit rate data transmission is the requirement that the data to be transmitted utilizing a channel encoding process that protects the data from irregularities in the transmission channel. This significantly increases the bit rate required for the data transmission. As will be discussed below, the speech parameters vary significantly in their importance in speech replication. For example, if one of the energy parameters is altered in the transmission process, speech replication will not be significantly affected. However, if pitch information becomes altered, it will likely render the speech replication unintelligible. As used in the art, "pitch" generally refers to the period or frequency of the buzzing of the vocal cords or glottis, "spectrum" generally refers to the frequency dependent properties of the vocal tract, "energy" generally refers to the magnitude or intensity of the speech waveform, "voicing" refers to whether or not the vocal cords are active, and "quantizing" refers to choosing one of a finite number of discrete values to characterize these ordinarily continuous speech parameters. The number of different quantized values (or levels) for a particular speech parameter is set by the number of bits assigned to code that speech parameter. The foregoing terms are well known in the art and commonly used in connection with vocoding (voice-coding).

Vocoders may be built which operate at rates ranging from 200 to 9600 bits per second, with varying results depending on the bit rate. One skilled in the art will readily note that the quality of reconstructed voice varies depending not only on the bit rate chosen, but also on parameters previously discussed (e.g., pitch period, spectrum bandwidth, energy, voicing, etc.). Typically, as the transmission channel bandwidth narrows, the allowable bit rate will fall accordingly. Consequently, as the allowable bit rate falls, it becomes more difficult to find a data compression scheme that provides clear, intelligible, synthesized speech. Low bit rates further aggravate the problem of digital voice transmission since error-free reception requires a channel encoding scheme that adequately protects the selected parameters from corruption. Accordingly, a scheme must be selected that adequately protects the coded voice data without adding significant overhead, resulting in increased bit rate requirements. In addition, practical communication systems must take into consideration the complexity of the coding scheme since unduly complex coding schemes cannot be substantially executed in real time or using computer processors of reasonable size, speed, complexity and cost. Processor power consumption is also an important consideration since vocoders are frequently used in hand-held and portable apparatus.

As used herein the term "data compression" is intended to refer to the creation of a set of quantized parameters describing the input speech and "de-compression" is intended to refer to the subsequent use of this set of quantized parameters to synthesize a replica of the input speech. Also, as used herein "channel encoding" is referred to as both the encoding and decoding of the compressed speech parameter data for the protection of the data when passed through a transmission channel. The word "vocoder" (voice coder) has been coined in the art to describe an apparatus which performs the aforementioned functions.

While prior art vocoders are used extensively, they suffer from a number of limitations well known in the art, especially when low bit rates are desired. For example, Linear Prediction Coding ("LPC") has been widely used in low bit rate speech coding. In a LPC-based vocoder, each frame is represented by two sets of parameters. One is the spectral parameter set while the other is a set of excitation parameters which include pitch, voicing and energy information. In interactive communication systems, speech data is coded and transmitted on a frame-by-frame basis, where latency is a critical performance measure. The United States government standard vocoder, known as the LPC-10(e), illustrates such vocoders. The LPC-10(e) requires 5 and 6 bits, respectively, to code the (i) energy and (ii) pitch and voicing parameters for a total of 11 bits of information. While the bit requirements of the LPC-10(e) coder evidence a marked improvement over prior systems, room for improvement remains.

Thus, there is a continuing need in the art for an improved compressed voice digital communication system capable of providing a method for further compressing selected excitation parameters.

DESCRIPTION OF A PREFERRED EMBODIMENT

Figure 1:
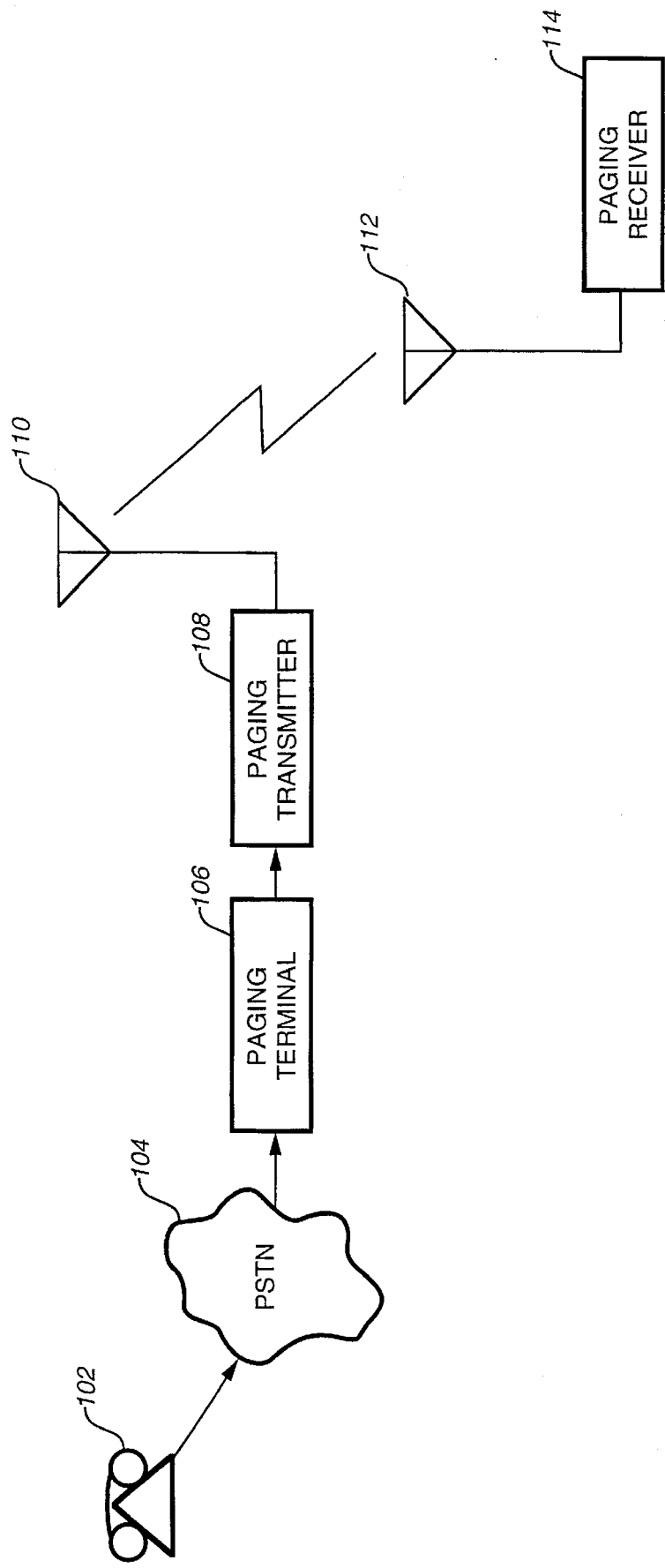
FIG. 1 is a block diagram of a communication system, such as a selective call communication system, that utilizes a novel compression scheme in accordance with a preferred embodiment of the present invention.

FIG. 1 shows a block diagram of a communication system, such as a selective call communication system, that utilizes a novel compression scheme in accordance with the present invention. The digital voice compression process and encoding scheme are adapted to the store and forward type communications systems, which provide the time required to perform the highly computational intensive voice compression and channel encoding processes. Furthermore, it minimizes the processing required to be performed in a portable communication device, such as a pager, making the process ideal for paging applications and other similar store and forward type voice communications. The highly computational intensive portion of the digital voice compression process is performed in a fixed portion of the system and as a result little computation is required to be performed in the portable portion of the system as will be described below.

This invention is exemplified by incorporation into a selective call communication system (e.g., a paging system or the like), although it will be appreciated that any device which transmits speech parameters and requires channel coding prior to transmission will benefit from the present invention as well. Paging systems are typically designed to provide service to a variety of users each requiring different services. Some of the users will require numeric messaging services, and still others users may require voice messaging services. In a paging system, a caller originates a page by communicating with a paging terminal 106 via a telephone 102 through the public switched telephone network (PSTN) 104 or the like. The paging terminal 106 encodes the message and places the encoded message in a transmission queue. At an appropriate time, the messages are broadcast under control of the paging terminal 106 using a transmitter 108 and a transmitting antenna 110. It will be appreciated that in a simulcast transmission system, a multiplicity of transmitters covering different geographic areas can be utilized as well, thus increasing geographic coverage. Moreover, the communication system may be structured in a fashion similar to conventions multi-frequency and multi-code cellular communication systems to provide versatile wide-area coverage.

The signal transmitted from the transmitting antenna is intercepted by a receiving antenna 112 and processed by a paging receiver 114. The person being paged may be alerted and the message may be displayed or enunciated depending on the type of messaging being employed.

Figure 2:
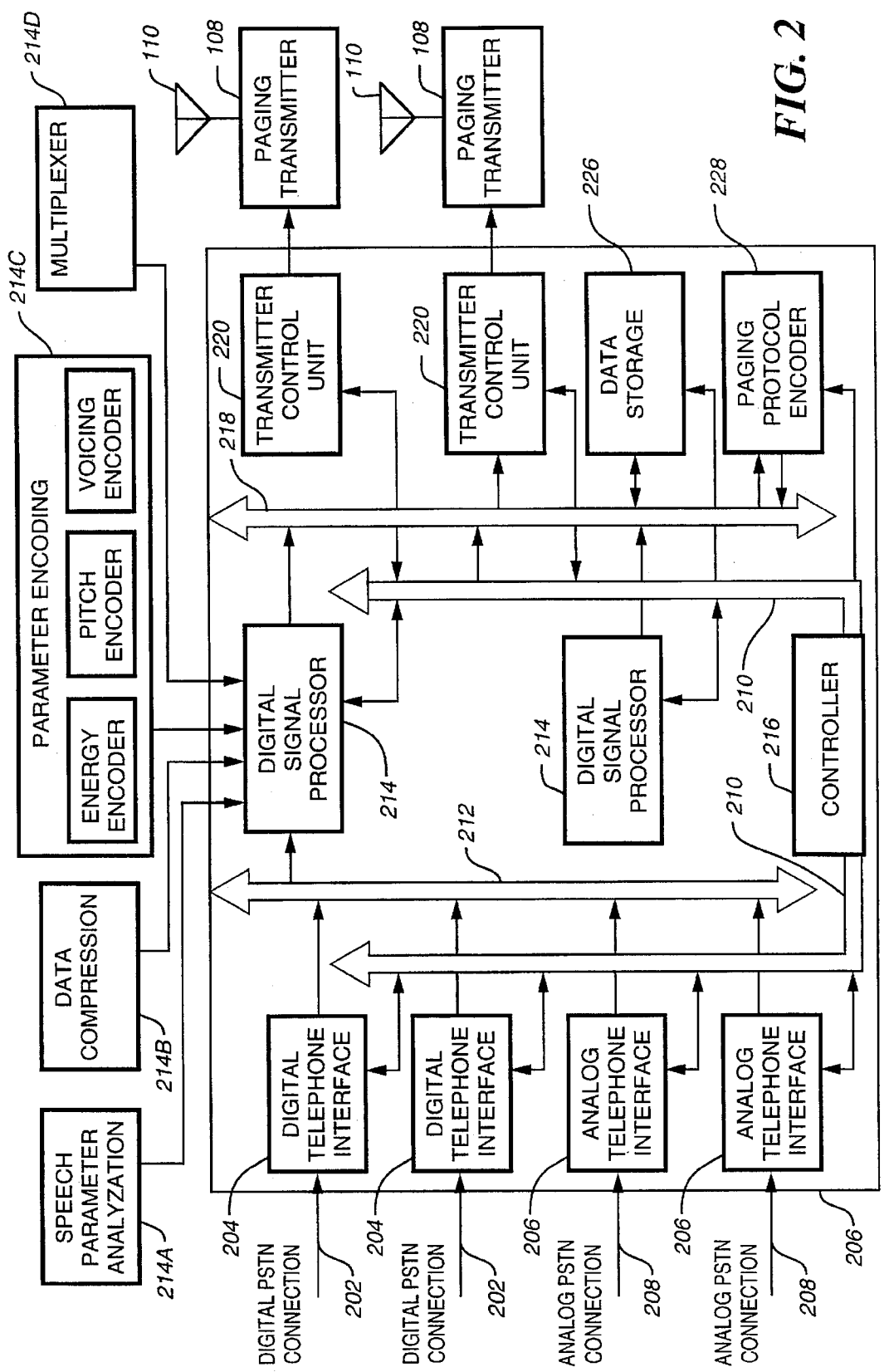
FIG. 2 is an electrical block diagram of a paging terminal and associated paging transmitters utilizing the novel channel encoding scheme of the preferred embodiment of the present invention.

FIG. 2 is an electrical block diagram of the paging terminal 106 and the paging transmitter 108 utilizing digital voice compression and encoding in accordance with the preferred embodiment of the present invention. The paging terminal 106 shown in FIG. 1 is of a type that may be used to service a large number of simultaneous users, such as in a commercial Radio Common Carrier (RCC) system. The paging terminal 106 utilizes a number of input devices, signal processing devices and output devices controlled by a controller 216. Communications between the controller 216 and the various devices that compose the paging terminal 106 are handled by a digital control bus 210. Communication of digitized voice and data is handled by an input time division multiplexed highway 212 and an output time division multiplexed highway 218. It will be appreciated that the digital control bus 210, input time division multiplexed highway 212 and output time division multiplexed highway 218 can be extended to provide for expansion of the paging terminal 106.

The interface between the PSTN 104 and the paging terminal 106 can be either a plurality of multi-call per line multiplexed digital connections shown in FIG. 2 as a digital PSTN connections 202 or plurality of single call per line analog PSTN connections 2081. In alternative embodiments, the interface may take the form of a high speed local area or wide area network interface, utilizing such conventional communication protocols as TCP/IP or the like. One of ordinary skill would appreciate that other conventional data transport mechanisms, both analog and digital, may be employed within the scope and intent of the present invention.

Each digital PSTN connection 202 is serviced by a digital telephone interface 204. The digital telephone interface 204 provides necessary signal supervision, regulatory protection requirements for operation of the digital voice compression process and data protection in accordance with the present invention. The digital telephone interface 204 can also provide temporary storage of the digitized voice frames to facilitate interchange of time slots and time slot alignment necessary to provide an access to the input time division multiplexed highway 212. As will be described below, requirements for service and supervisory responses are controlled by a controller 216. Communications between the digital telephone interface 204 and the controller 216 passes over the digital-control bus 210.

Each analog PSTN connection 208 is serviced by an analog telephone interface 206. The analog telephone interface 206 provides the necessary signal conditioning, signaling, supervision, analog to digital and digital to analog conversion, and regulatory protection requirements for operation of the digital voice compression and channel encoding processes in accordance with the present invention. The frames of digitized voice messages from the analog to digital converter are temporarily stored in the telephone interface 206 to facilitate interchange of time slots and time slot alignment necessary to provide an access to the input time division multiplexed highway 212. Communications between the analog telephone interface 206 and the controller 216 pass over the digital control bus 210.

When an incoming call is detected, a request for service is sent from the analog telephone interface 206 or the digital telephone interface 204 to the controller 216. The controller 216 selects a digital signal processor 214 from a plurality of digital signal processors. The controller 216 couples the analog telephone interface 206 or the digital telephone interface 204 requesting service to the digital signal processor 214 selected via the input time division multiplexed highway 212.

The digital signal processor 214 can be programmed to perform all of the signal processing functions required to complete the paging process. Typical signal processing functions performed by the digital signal processor 214 include voice analyzation, digital voice compression, encoding in accordance with the present invention, dual tone multi-frequency (DTMF) decoding and generation and modem tone generation. The digital signal processor 214 can be programmed to perform one or more of the functions described above. In the case of a digital signal processor 214 that is programmed to perform more than one task, the controller 216 assigns the particular task needed to be performed at the time the digital signal processor 214 is selected, or in the case of a digital signal processor 214 that is programmed to perform only a single task, the controller 216 selects a digital signal processor 214 programmed to perform the particular function needed to complete the next step in the paging process. The operation of the digital signal processor 214 performing dual tone multi-frequency (DTMF) decoding and prerecorded voice prompt generation is well known to one of ordinary skill in the art.

The processing of a page request, in the case of a voice, message, proceeds in the following manner. The digital signal processor 214 that is coupled to an analog telephone interface 206 or a digital telephone interface 204 prompts the originator for a voice message. The digital signal processor 214 analyzes the input speech for pitch, energy, spectral parameters and voicing information 214A and then compresses 214B and encodes 214C the data using the novel methods discussed in reference to in FIGS. 7 through 10. The digital signal processor 214 may alternatively process the digital voice message generated using a channel encoding method such as the encoding method disclosed in U.S. patent application Ser. No. 08/537,369 entitled "METHOD FOR PROTECTING COMPRESSED SPEECH IN VERY LOW BIT RATE VOICE MESSAGING" assigned to Motorola, Inc., which is incorporated by reference. It may be further appreciated that other encoding methods can be utilized without departing from the spirit of this invention. The compressed and channel encoded data is multiplexed by the digital signal processor 214D and then coupled to a paging protocol encoder 228 via the output time division multiplexed highway 218, under the control of the controller 216. The controller 216 directs the paging protocol encoder 228 to store the encoded data in a data storage device 226 via the output time division multiplexed highway 218. At an appropriate time, the compressed and channel encoded data is downloaded into the transmitter control unit 220, under control of the controller 216, via the output time division multiplexed highway 218 and transmitted using the paging transmitter 108 and the transmitting antenna 110.

Figure 3:
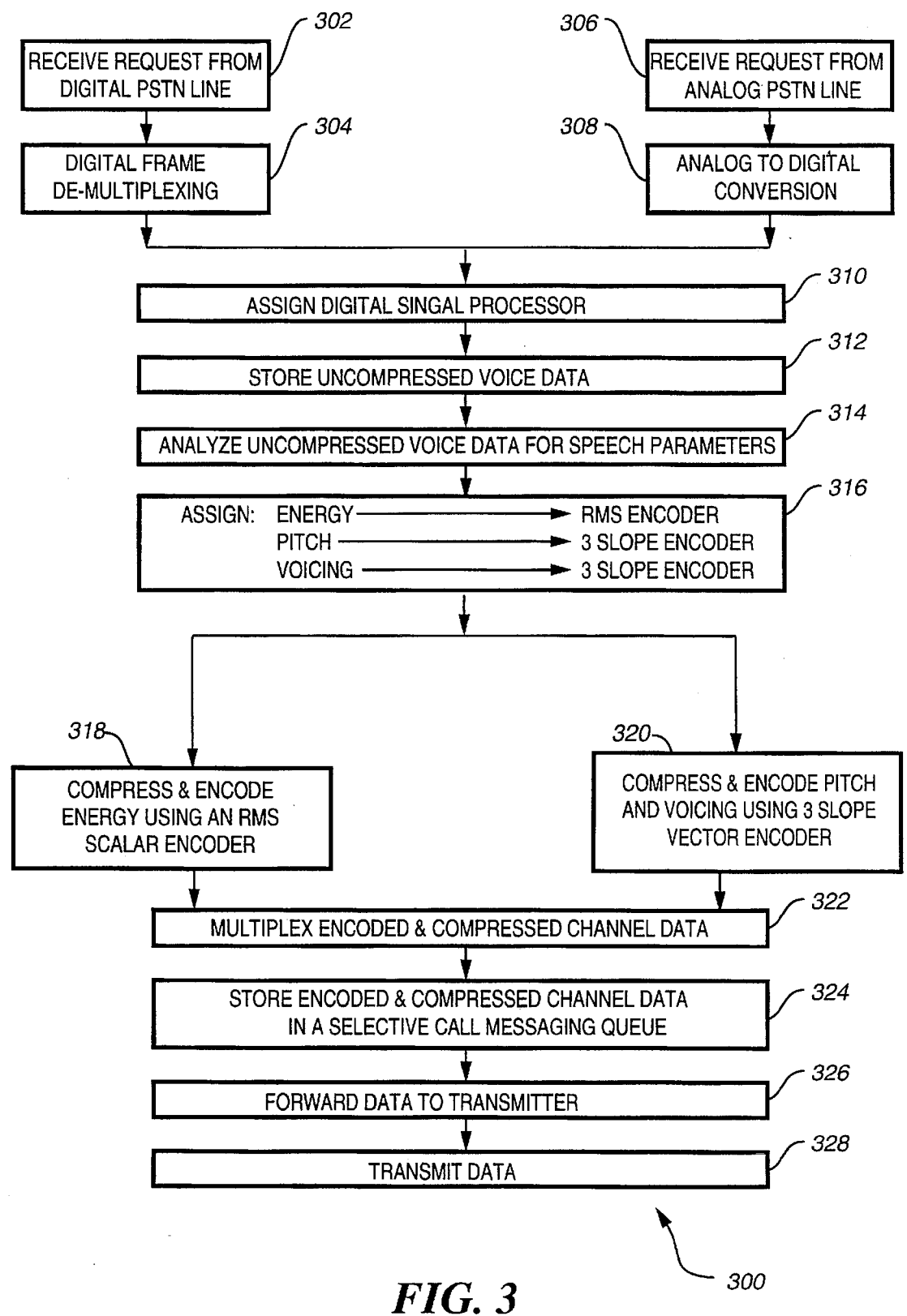
FIG. 3 is a flow diagram that illustrates the operation of the paging terminal of FIG. 2.

FIG. 3 is a flow diagram that illustrates the operation of the paging terminal 106 shown in FIG. 1 when processing a voice message. There are shown two entry points into the flow chart 300. The first entry point is for a process associated with the digital PSTN connection 202 and the second entry point is for a process associated with the analog PSTN connection 208. In the case of the digital PSTN connection 202, the process starts with step 302, receiving a request over a digital PSTN line. Requests for service from the digital PSTN connection 202 are indicated by a bit pattern in the incoming data stream. The digital telephone interface 204 receives the request for service and communicates the request to the controller 216.

In step 304, information received from the digital channel requesting service is separated from the incoming data stream by digital de-multiplexing. The digital signal received from the digital PSTN connection 202 typically includes a plurality of digital channels multiplexed into an incoming data stream. The digital channels requesting service are de-multiplexed and the digitized speech data is then stored temporarily to facilitate time slot alignment and multiplexing of the data onto the input time division multiplexed highway 212. A time slot for the digitized speech data on the input time division multiplexed highway 212 is assigned by the controller 216. Conversely, digitized speech data generated by the digital signal processor 214 for transmission to the digital PSTN connection 202 is formatted suitably for transmission and multiplexed into the outgoing data stream.

Similarly with the analog PSTN connection 208, the process starts with step 306 when a request from the analog PSTN line is received. On the analog PSTN connection 208, incoming calls are signaled by either low frequency AC signals or by DC signaling. The analog telephone interface 206 receives the request and communicates the request to the controller 216.

In step 308, the analog voice message is converted into a digital data stream. The analog signal received over its total duration is referred to as the analog voice message. The analog signal is sampled and digitized. The samples of the analog signal are referred to as voice samples. The digitized voice samples are referred to as digitized speech data. The digitized speech data is multiplexed onto the input time division multiplexed highway 212 in a time slot assigned by the controller 216. Conversely any voice data on the input time division multiplexed highway 212 that originates from the digital signal processor 214 undergoes a digital to analog conversion before transmission to the analog PSTN connection 208.

As shown in FIG. 3, the processing path for the analog PSTN connection 208 and the digital PSTN connection 202 converge in step 310, when a digital signal processor is assigned to handle the incoming call. The controller 216 selects a digital signal processor 214 programmed to perform the input speech analyzation, compression, channel encoding and multiplexing. The digital signal processor 214 assigned reads the data on the input time division multiplexed highway 212 into the previously assigned time slot.

The data read by the digital signal processor 214 is stored for processing, in step 312, as uncompressed speech data. In step 314, the stored uncompressed, multi-frame speech data is analyzed. In step 316, the analyzed speech data is assigned to one of three groups according to energy, pitch, and voicing parameters, which are buffered so that each set of parameters may be coded independently. In steps 318, 320, and 322, the grouped data is encoded utilizing the novel compression schemes discussed in reference to FIGS. 7 through 10. Once the data is encoded, it is passed to a multiplexer wherein the data is multiplexed 324 and then stored in a paging queue 326 for later transmission. At the appropriate time, the queued data is sent to the transmitter 108 at step 328 and transmitted, at step 330.

Figure 4:
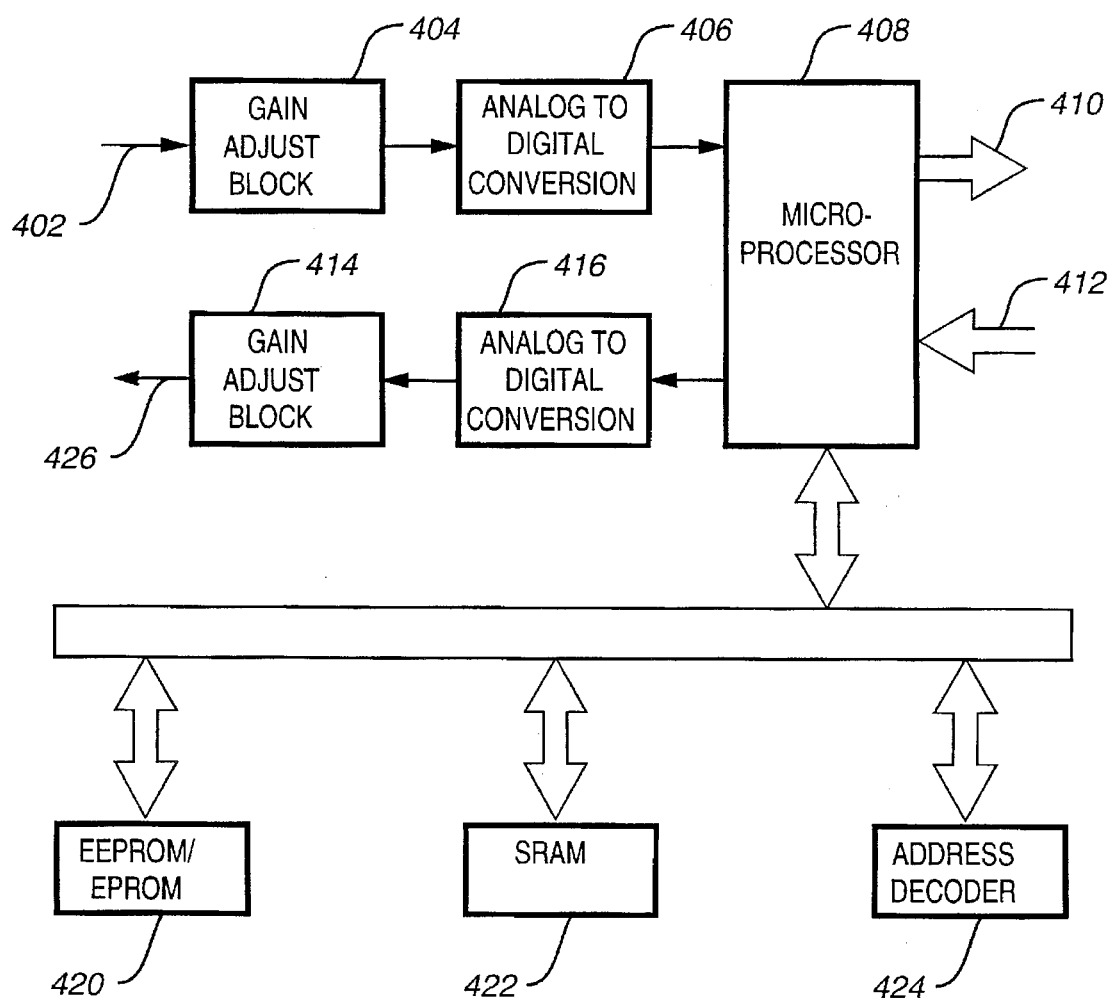
FIG. 4 is a block diagram of a digital signal processor that can be utilized in the paging terminal of FIG. 2 and paging receiver of FIG. 6.
Figure 6:
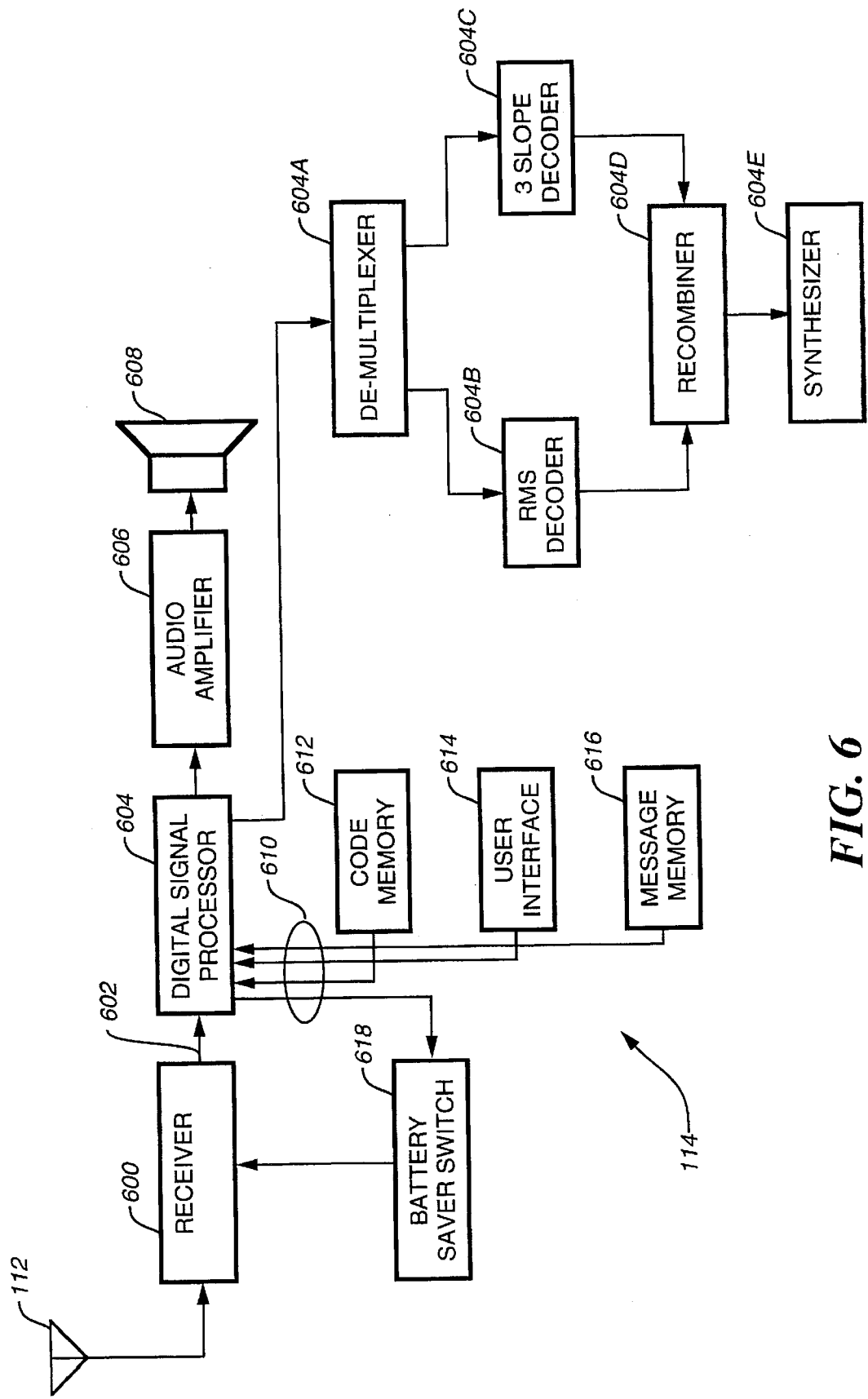
FIG. 6 is an electrical block diagram of a paging receiver utilizing the novel channel encoding scheme of the preferred embodiment of the present invention.

FIG. 4 is a block diagram of a digital signal processor that can be utilized in the paging terminal of FIG. 2 and paging receiver of FIG. 6. The digital signal processor 400 functions both as an analyzer to determine the essential speech parameters and as a synthesizer to reconstruct a replica of the input speech input based on such speech parameters.

When acting as an analyzer (i.e. coder), vocoder 400 receives speech input 402 which then passes through gain adjustment block 404 (e.g., an AGC) and analog to digital (A/D) converter 406. A/D 406 supplies digitized input speech to microprocessor or controller 408. Microprocessor 408 communicates over bus 418 with ROM 420 (e.g., an EPROM or EEPROM), alterable memory (e.g., SRAM) 422 and address decoder 424. These elements act in concert to execute the instructions stored in ROM 420 to divide the incoming digitized speech into frees and analyze the frames to determine the significant speech parameters associated with each frame of speech, as for example, pitch spectrum, energy and voicing. These parameters are delivered to output 410 from whence they go to a channel coder and a multiplexer for eventual transmission to a receiver.

When acting as a synthesizer (i.e. decoder), vocoder 400 receives speech parameters from the de-multiplexer and a channel decoder via input 412. These speech parameters are used by microprocessor 408 in connection with SRAM 424 and address decoder 46 and the program stored in ROM 420, to provide digitized synthesized speech to D/A converter 416 which converts the digitized synthesized speech back to analog form and provides synthesized analog speech via optional gain adjustment block 414 to output 426 for delivery to a loud speaker or head phone.

Although similar vocoders, such as the General Purpose Voice Coding Module (GP-VCM), Part No. 01-P36780D001 manufactured by Motorola, Inc. exist, by programming ROM 420, the vocoder 400 of FIG. 4 is capable of not only analyzing speech parameters and compressing them utilizing the novel compression scheme, but also channel encoding these quantized speech parameters, thereby-significantly decreasing the bit rate that would be required with previous compression schemes, without affecting the quality of the speech replication.

Figure 5:
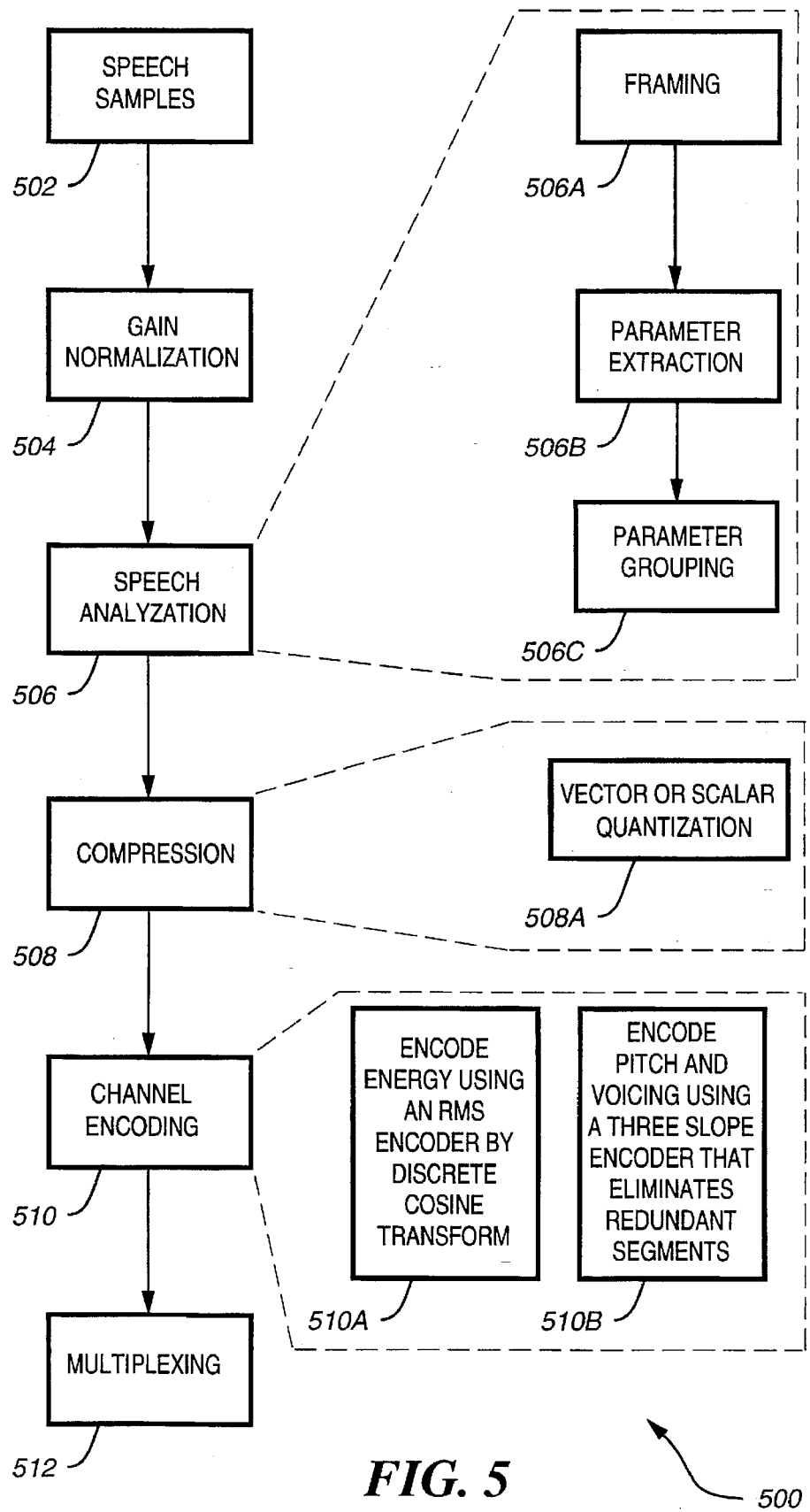
FIG. 5 is a flow diagram that illustrates the operation of a digital signal processor utilized in the paging terminal of FIG. 2.

FIG. 5 is a flow diagram that illustrates the functions performed by the digital signal processor utilized in the paging terminal of FIG. 2. The digital speech data 502 that was previously stored in the digital signal processor 214 as uncompressed voice data is passed through a gain normalization step 504 and analyzed at step 506. The amplitude of the digital speech message is adjusted on a syllabic basis to fully utilize the dynamic range of the system and improve the apparent signal-to-noise performance.

The normalized uncompressed speech data is grouped into short duration segments of speech in step 506A. Typically the groups contain twenty to thirty milliseconds of speech data. In step 506B, an analyzer extracts the energy, spectrum, voice, and pitch parameters in parallel, utilizing respective extraction methods which are well known to those skilled in the relevant art. For example, a linear predictive coding (LPC) process is performed on the short duration segment of speech to provide a short term prediction. The LPC process analyzes the short duration segments of speech and extracts the spectrum parameters. There are many different LPC processes known in the art of digital processing, and the art continues to develop improved methods. It will be apparent to one of ordinary skill in the art which LPC or other method will best meet the requirement of the system being designed.

Due to the non-real time communications of the present invention a buffer is provided in step 508A, wherein the speech parameters of pitch, energy voicing and spectral parameters from a plurality of frames are grouped. In the preferred embodiment of the present invention, the speech parameters are separated into a first group of energy parameters and a second group of pitch and voicing parameters. Depending upon the parameter set being addressed, the parameter sets are then compressed in step 508B. Note that compression and coding of the vectors associated with the spectral parameters is accomplished in a conventional manner, and for reasons of clarity and simplicity, is not shown here. One of ordinary skill in the art would appreciate that in order to reproduce human utterances using the procedures discussed herein, the spectral parameters must be transmitted and received along with the first group of energy parameters and a second group of pitch and voicing parameters.

Following the compression Process, a second buffer is provided to allow for the channel encoding step 510. In step 510A, the energy parameter set is encoded utilizing a type of discrete cosine transform and a non-uniform root-mean-square scalar process that creates a first plurality of encoded data. In step 510B, the second group of pitch and voicing parameters are combined into a single parameter using a three slope vector encoding process that creates a second plurality of encoded data. The encoded data from steps 510A and 510B is then passed to a multiplexer 512 where,the first and second plurality of encoded data are multiplexed to create a multiplexed signal for subsequent transmission, the multiplexed signal representing the original voice message.

FIG. 6 is an electrical block diagram of the paging receiver 114. The signal transmitted from the transmitting antenna 110 is intercepted by the receiving antenna 112. The receiving antenna 112 is coupled to a receiver 600. The receiver 600 processes the signal received by the receiver antenna 112 and produces a receiver output signal 602 which is a replica of the encoded data transmitted (e.g., the multiplexed signal). The output signal is passed to a selected digital signal processor 604 wherein a de-multiplexer 604A de-multiplexes the encoded speech parameters and sends the data to either an RMS decoder 604B or a 3 slope decoder 604C for decompressing and decoding the de-multiplexed signals. More specifically, the RMS decoder 604B operates to decode the first plurality of encoded data using an inverse non-uniform root mean-square scalar process that recovers the first group of speech parameters. Similarly, the 3 slope decoder 604C decodes the second plurality of encoded data using an inverse three slope vector encoding process to recover the second group of pitch and voicing parameters from the single parameter. When the first and second groups of speech parameters are recovered, they are re-combined 604D, along with vectors associated with the spectral parameters representing the original voice (not shown), for presentation to the synthesizer 604E, which reconnects the analyzed frames of speech to synthesize a reproduction of the speech parameters that replicates the original voice message.

The digital signal processor 604 also provides the basic control of the various functions of the paging receiver 114. The digital signal processor 604 is coupled to a battery saver switch 618, a code memory 612, a user interface 614, and a message memory 616, via the control bus 610. The code memory 612 stores unique identification information or address information, necessary for the controller to implement the selective call feature. The user interface 614 provides the user with an audio, visual or mechanical signal indicating the reception of a message and can also include a display and push buttons for the user to input commands to control the receiver. The message memory 616 provides a place to store messages for future review, or to allow the user to repeat the message. The on/off or battery saver switch 618 provides means of selectively disabling the supply power to the receiver during a period when the system is communicating with other pagers or not transmitting, thereby reducing power consumption and extending battery life in a manner well known to one with ordinary skill in the art. The battery saving feature may be implemented either as a manual (user action required) or automatic function.

Figure 7:
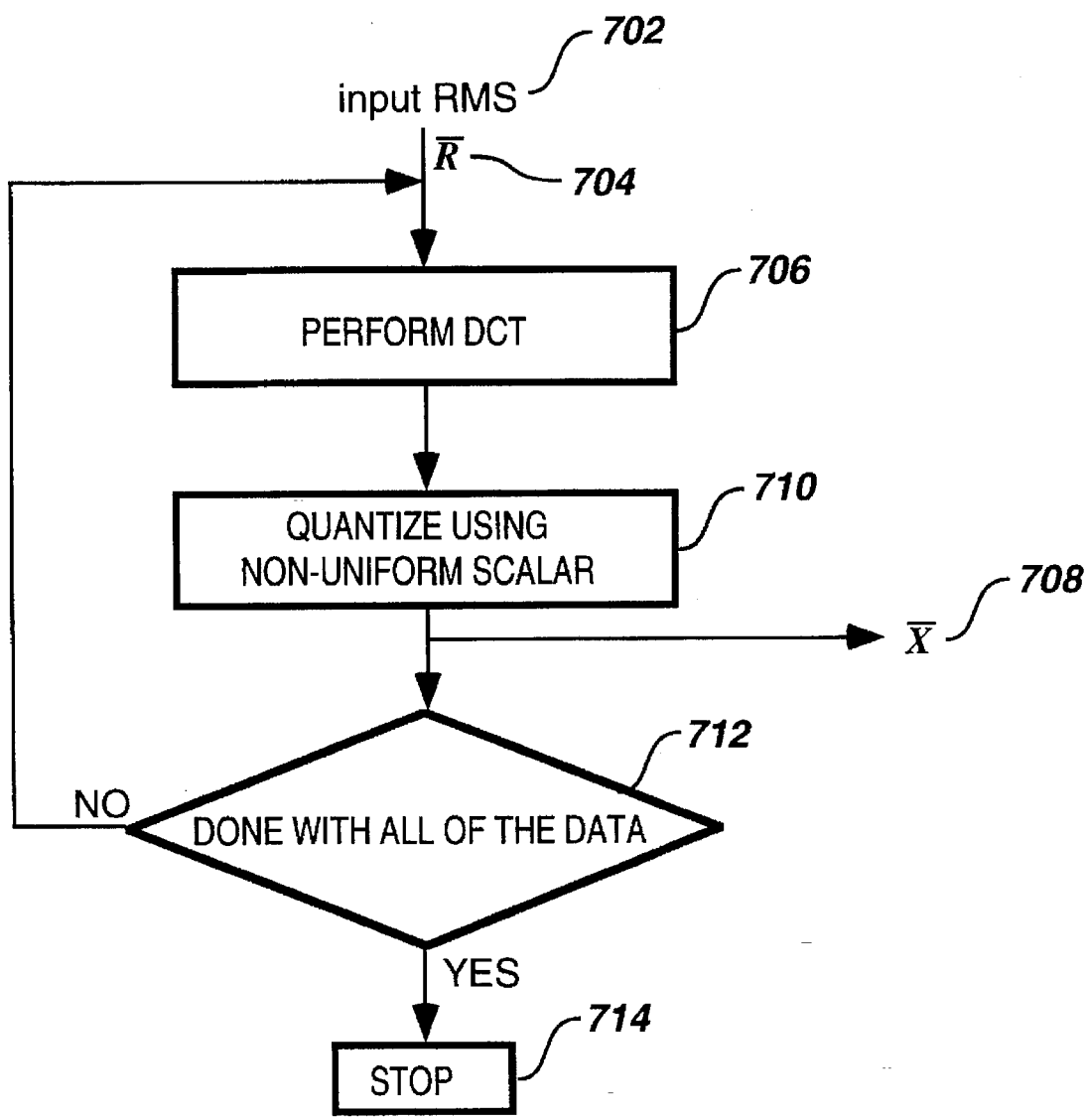
FIG. 7 is a flow diagram that illustrates an RMS encoding sequence of the energy parameter in accordance with a preferred embodiment of the present invention.

Referring to FIG. 7, the flow diagram illustrates an RMS encoding sequence of the energy parameter in accordance with a preferred embodiment of the present invention.

In the preferred embodiment, an input buffered RMS signal 702 represented by a vector R 704 is processed utilizing a discrete cosine transform (DCT) 706, resulting in a transformed first group of energy parameters. The DCT applied here, which is commonly used in adaptive transform coders (ATCs), has a performance very close to the optimum signal dependent Karhunen-Loeve transform (KLT) and significantly superior to the others. Indeed, the DCT has been found to be ideally suited for the coding of speech as well as picture signals. Apart from its signal independence, and its approximation to the KLT, its even symmetry helps to minimize the edge effects encountered in block coding methods. The DCT of an N point sequence is defined by the relation:

$$S_c(k) = \sum_{n=0}^{N-1} s(n)c(k)\cos\left[\frac{(2n+1)k\pi}{2N}\right]$$

More specifically, first group of energy parameters comprising the buffered RMS 702 from multiple frames, represented by vector R 704, is transformed to a new vector X 708 through the DCT 706. Next, the vector X 708 is quantized using a non-uniform scalar quantization 710 to create the first plurality of encoded data for transmission. Generally, scalar quantization is applicable when high quantization accuracy is required. Scalar quantization, as used here, has the advantage that it is simple to implement and is more robust than the vector quantization methods under conditions that may yield high error probabilities. The advantage of quantizing the vector X 708 instead of the original energy vector R 704 is that the inter-frame redundancy of energy data can be clearly seen after the DCT 706 is performed. This process is repeated 712 until all data has been processed 714.

Figure 8:
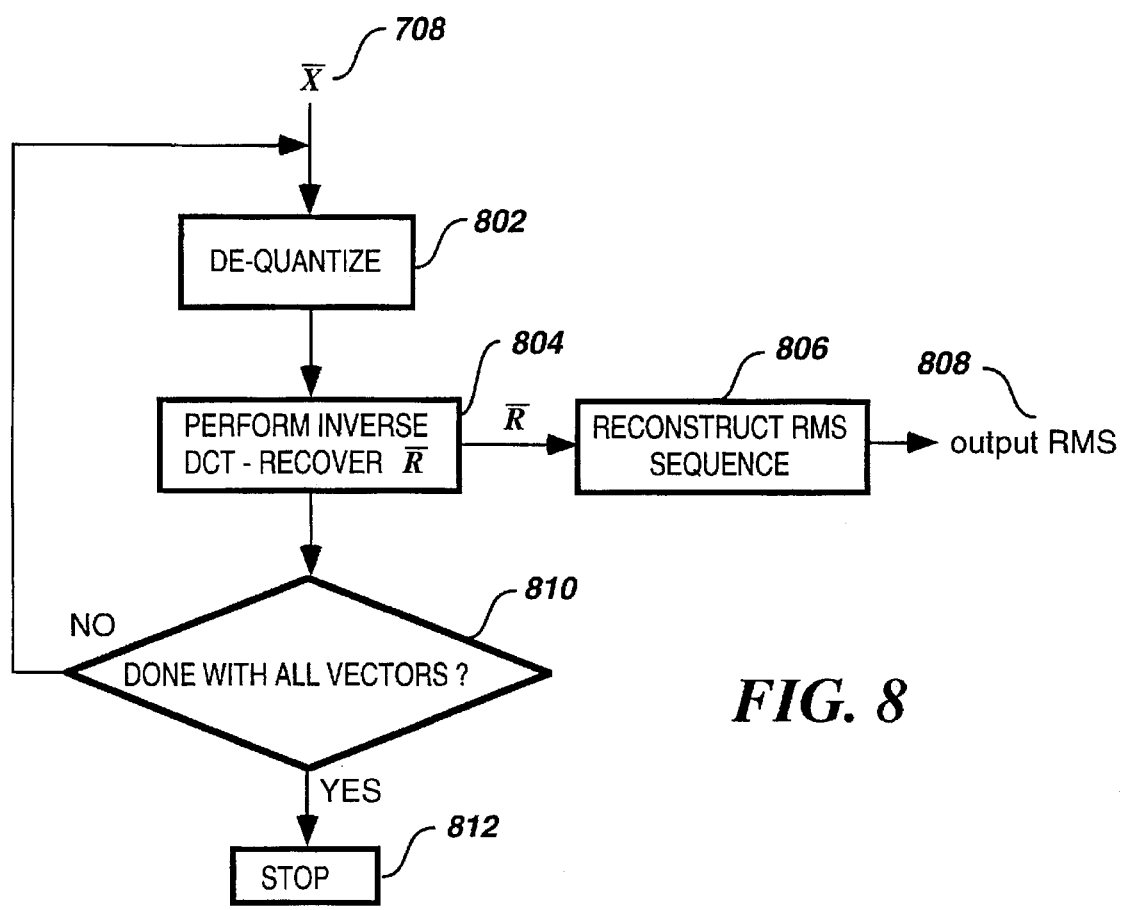
FIG. 8 is a flow diagram that illustrates an RMS decoding sequence of the energy parameter in accordance with the preferred embodiment of the present invention.

Referring to FIG. 8, the flow diagram illustrates an RMS decoding sequence or inverse RMS encoder, applicable to recover the energy parameter in accordance with the preferred embodiment of the present invention.

First, the quantized vector X 708 from FIG. 7 is dequantized 802. Next, vector R 704 is recovered from the dequantized vector X 708 using an inverse discrete cosine transform (IDCT) 804. The results of the IDCT are assembled in a sequence 806 represented by the relation:

$$s(n) = \frac{1}{N}\sum_{k=0}^{N-1} S_c(k)c(k)\cos\left[\frac{(2n+1)k\pi}{2N}\right]$$

which results in an output RMS 808 that is substantially identical to the input RMS 702. This procedure is repeated 810 until all vectors X 708 have been processed 812.

Figure 9:
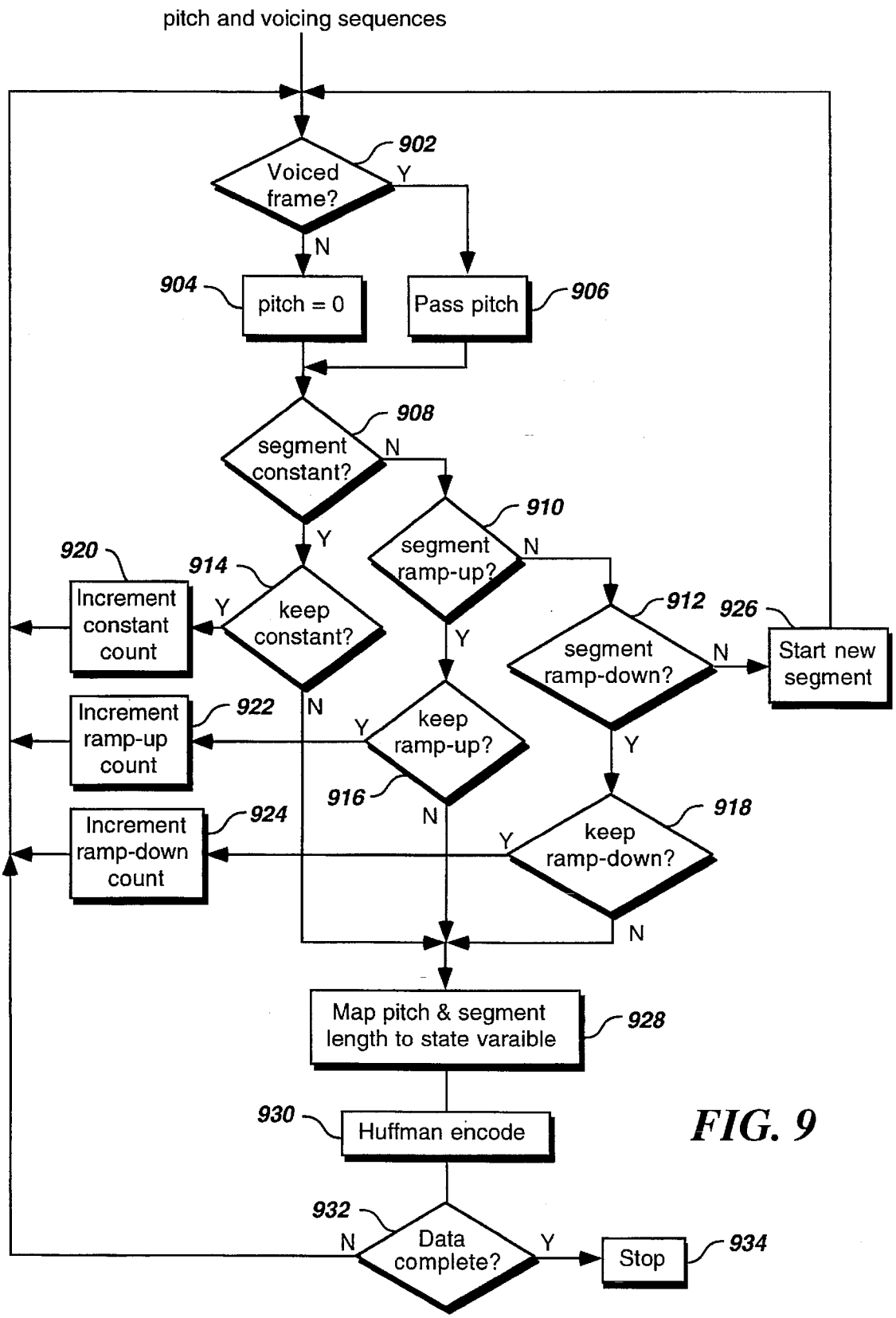
FIG. 9 is a flow diagram that illustrates the pitch and voicing encoding of the pitch and voicing parameters in accordance with a preferred embodiment of the present invention.

Referring to FIG. 9, the flow diagram illustrates the pitch and voicing encoding of the pitch and voicing parameters in accordance with a preferred embodiment of the present invention.

Strong inter-frame dependency exhibited in the RMS energy parameters previously coded is also seen in the pitch and voicing parameters. However, a different compression method is necessary since the pitch and voicing values require higher accuracy for accurate reproduction. Accordingly, the following method accounts for the increased precision required, thus effectively coding the pitch and voicing parameters in the most optimal way possible in a very low bit rate digital speech system.

Beginning in step 902, pitch and voicing are combined into one parameter to allow elimination of any redundancies. This is done by assigning an unvoiced frame to a first pitch value, e.g., "0" 904. The first pitch value of "0" will not appear in voiced frames. Otherwise, in a voiced frame, a second pitch value is assigned corresponding with the actual pitch value 906.

Step 908 begins a multi-frame segmentation process that linearizes and segments the pitch sequence into three categories: (1) constant segments 908, (2) ramp-up segments 910, and (3) ramp-down segments 912. Each segment is represented by two values, the pitch and the segment length. In a constant segment, all pitch values of frames of the segment are the same 914. The pitch value of the constant segment is the value of the first frame of the segment. In a ramp-up segment, pitch value increases linearly in time 916. In a ramp-down segment, pitch value decreases linearly in time 918.

In the preferred embodiment, the pitch value of a ramp-up segment is predefined as "1" 916, representing only the direction of the value change. Similarly, the pitch value for a ramp-down segment is predefined as "2" 918. Depending on the trend indicated by the pitch value of the most recent segment examined, the frame counters are either updated, or a new segment is started and the counters 920, 922, 924 are reset to "0".

The multi-frame segmentation process described above process is implemented by comparing a pitch value of a subsequent frame to a pitch value of a prior frame to determine a pitch trend. The pitch trend corresponds with one of the three conditions noted, (1) constant, (2) ramp-up or increasing, and (3) ramp-down or decreasing. First, a constant pitch is indicated for a subsequent frame having a like pitch value 908, 914. Second, an increasing pitch is indicated for a subsequent frame having a greater pitch value 910, 916. Third, a decreasing pitch is indicated for a subsequent frame having a lesser pitch value 912, 918. The multi-frame segmentation process operates to accumulate a number of like pitch trend frames until the pitch trend changes 920, 922, 924. This allows the encoder to optimally determine the trend associated with a group of frames, and eliminates the need to code each and every frame when a trend is detected. Furthermore, the accumulator inherently counts the number of frames with like characteristics, e.g., constant, increasing or decreasing.

Once the pitch trend and the number of like pitch trend frames gave been determined, the result is mapped into a segment variable for further coding. Each segment which is represented by two components, the pitch and segment length, is mapped to a codeword 928.

In step 930 the codeword is further coded using a Huffman encoding process. A Huffman code is chosen, having a codebook that is pre-designed to optimally correlate with the histogram of segments, thus yielding the most efficient coded data possible.

The preceding steps are repeated 932 until all pitch and voicing data has been encoded at which point the process is complete and the resulting data is transferred to the multiplexer 214D for multiplexing with the coded RMS data 708 for transmission.

Figure 10:
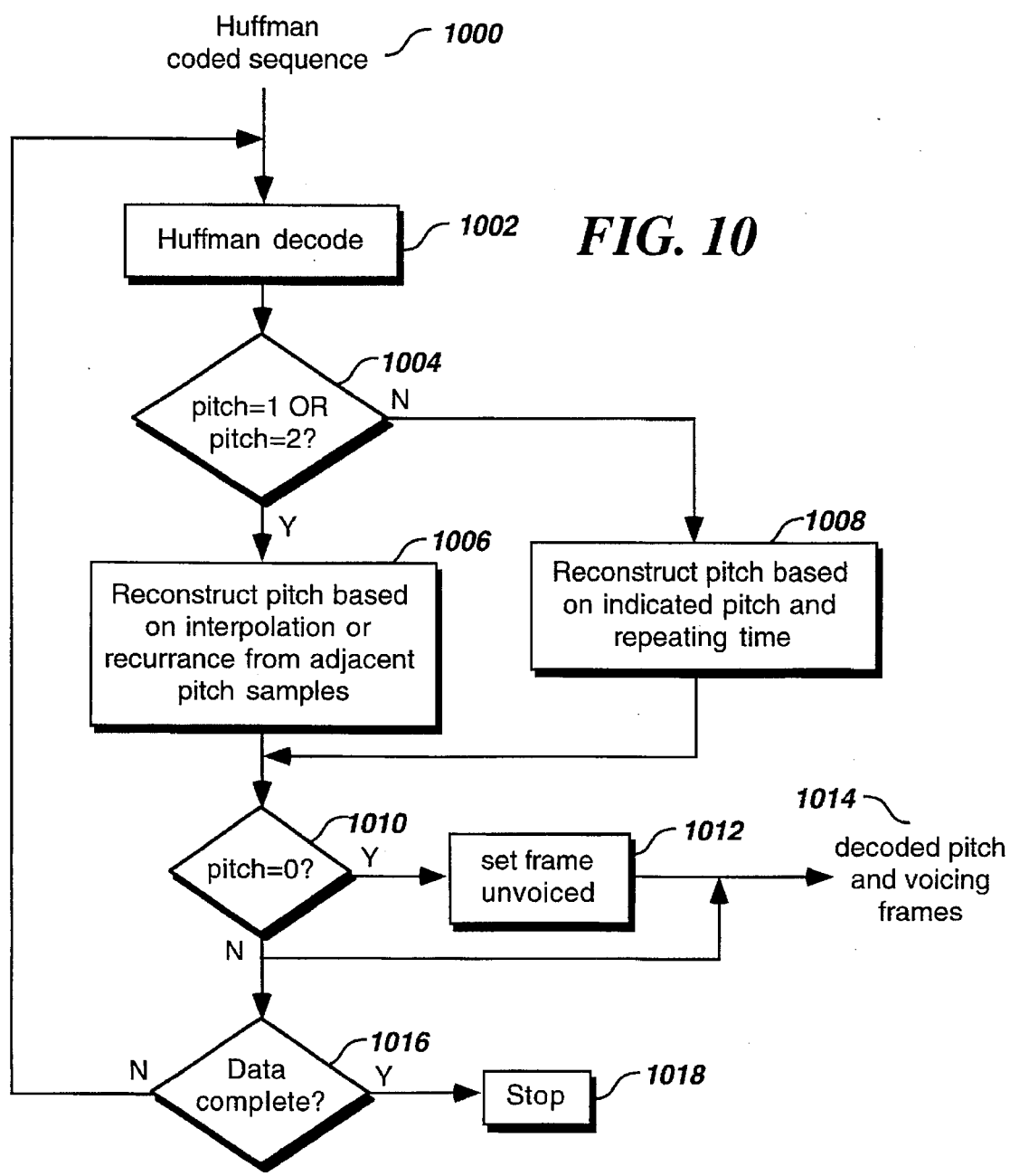
FIG. 10 is a flow diagram that illustrates the decoding of pitch and voicing parameters in accordance with the preferred embodiment of the present invention.

Referring to FIG. 10, the flow diagram illustrates an inverse three slope decoder that decodes the pitch and voicing parameters in accordance with the preferred embodiment of the present invention.

The Huffman decoder decodes the pitch and voicing data into a segment of pitches, depending on the value of the pitches 1004. The pitch value of each segment is recovered after the Huffman decoding 1002. For pitch values of "1" and "2" 1004, representing ramp-up and ramp-down segments respectively, the pitch value is reconstructed by linear interpolation between adjacent available pitches 1006. Otherwise, pitch value is reconstructed based on indicated pitch and repeating time 1008. For a pitch value of "0" 1010, is set as an unvoiced frame 1012. Otherwise, the frame is set as voiced (the default). After determining whether or not the frame is voiced, the decoded pitch and voicing frames 1014 are available for synthesis. This process is repeated 1016 until all pitch and voicing data is decoded at which point the process ceases 1018.

In summary, since state of the art voice messaging has become store-and-forward in nature, prior art LPC based vocoding methods based on short latency are no longer required. Hence, speech parameters can be buffered over multiple frames or even over an entire message. As a result, according to the present invention, there is provided an improved method for coding excitation parameters for very low bit rate messaging by utilizing a procedure that jointly codes energy parameters with the pitch and voicing parameters over multiple frames. By jointly processing multi-frame information, the novel methods disclosed can code the energy parameter at 2 bits per frame as well as the pitch and voicing parameters at 2 bits per frame. By comparison to the LPC-10(e) standard, the present invention is both more efficient as well as more effective for the following reasons.

First, using a conventional LPC-based speech coding method, the energy of each frame is represented by the root-mean-square (RMS) value of the speech samples. The frame rate typically ranges from 33 to 100 frames per second. This results in coded data having a relatively large number of bits, if the RMS value is coded for each individual frame. Instead of quantizing the RMS of an isolated frame, the present invention quantizes a block of frames based on a discrete cosine transform (DCT). In particular, a buffered RMS energy signal from multiple frames is transformed to a new energy signal through the DCT process and quantized for transmission. The advantage of quantizing this new energy signal is that the inter-frame redundancy of energy data can be seen clearly after the DCT process, and thus repetitive transmission of a common, unchanging quantity is avoided. This new energy signal is then transformed back to RMS through an inverse discrete cosine transform (IDCT).

Additionally, the previously described inter-frame dependency exhibited in the RMS may also be found in the pitch and voicing parameters. However, a different compression method is necessary since the pitch and voicing values require a higher degree of accuracy than that found in the energy parameter. In the present invention, coding for the pitch and voicing consists of three steps. The first step is to combine the voicing and pitch into one parameter. It is done by assigning unvoiced frames the pitch value of "0". A pitch value of "0" is guaranteed not to appear in voiced frames. The second step is a multi-frame segmentation whereby the pitch sequence is linearized and segmented into three categories: (1) piecewise constant segments, (2) ramp-up segments and (3) ramp-down segments. Each segment is further represented by two values, a pitch and a segment length. In a constant segment, all pitch values of frames of the segment are the same. The pitch value of a constant segment is the value of the first frame of the segment. In a ramp-up segment, pitch value increases linearly in time. The pitch value of a ramp-up segment is predefined as "1", representing only the direction of the value change. In a similar fashion, the pitch value for a ramp-down segment is predefined as "2". The final step codes the segment information. In particular, each segment, represented by pitch and segment lengths, is mapped to a code word.

Finally, a Huffman code is chosen as the coding framework and the Huffman codebook is pre-designed according to a histogram of segments. In a decoder, data in the Huffman code is decoded into a segment of pitches. The pitch value of each segment is recovered after the Huffman decoding. Further, a frame is recognized as an unvoiced frame if its decoded pitch value is "0".

Accordingly, it will be understood that the preferred embodiment of the present invention has been disclosed by way of example and that other modifications and alterations may occur to those skilled in the art without departing from the scope and spirit of the appended claims.

What is claimed is:

1. A method for coding speech parameters generated from a voice message, comprising the steps of:

separating the speech parameters to produce a first group of energy parameters and a second group of pitch and voicing parameters;

compressing and encoding the first group of energy parameters using a non-uniform root-mean-square scalar process to create a first plurality of encoded data;

compressing, encoding, and combining the second group of pitch and voicing parameters into a single parameter using a three slope vector encoding process that creates a second plurality of encoded data; and multiplexing the first and second plurality of encoded data to create a multiplexed signal for transmission, the multiplexed signal representing the voice message.

2. The method according to claim 1 further comprising the step of:

transmitting the multiplexed signal via a transmitter and a transmission channel to a receiver.

3. The method according to claim 2 further comprising the steps of:

receiving the multiplexed signal at the receiver which couples the multiplexed signal to a de-multiplexer;

demultiplexing the multiplexed signal creating a reproduction of the first and second plurality of encoded data;

decompressing and decoding the first plurality of encoded data using an inverse non-uniform root-mean-square scalar process to recover the first group of speech parameters;

decompressing and decoding the second plurality of encoded data using an inverse three slope vector encoding process to recover the second group of pitch and voicing parameters from the single parameter;

passing the first group of speech parameters and the second group of pitch and voicing parameters to a synthesizer; and synthesizing a reproduction of said speech parameters to replicate said voice message.

4. The method according to claim 1 wherein the non-uniform root-mean-square scalar process comprises the steps of:

performing a discrete cosine transform on the first group of energy parameters resulting in a transformed first group of energy parameters; and quantizing the transformed first group of energy parameters using a non-uniform scalar quantizer to create the first plurality of encoded data.

5. The method according to claim 1 wherein the three slope vector encoding process comprises the steps of:

assigning an unvoiced frame to a first pitch value and a voiced frame to a second pitch value;

comparing a pitch value of a subsequent frame to a pitch value of a prior frame to determine a pitch trend, the pitch trend comprising a constant pitch for a subsequent frame having a like pitch value, an increasing pitch for a subsequent frame having a greater pitch value, and a decreasing pitch for a subsequent frame having a lesser pitch value;

accumulating a number of like pitch trend frames until the pitch trend changes;

mapping the pitch trend and the number of like pitch trend frames to a segment variable encoding the segment variable using a Huffman encoding procedure adapted for efficient coding of low bit rate voice messaging; and repeating the assigning, comparing, accumulating, mapping, and encoding steps until all data in the second group of pitch and voicing parameters has been coded.

6. A very low bit rate channel encoding system that codes speech parameters generated from a voice message, the system Comprising:

an encoder, comprising:
- a processor for separating the speech parameters to produce a first group of energy parameters and a second group of pitch and voicing parameters;
- a non-uniform root-mean-square scalar encoder that encodes and compresses the first group of energy parameters to create a first plurality of encoded data;
- a three slope vector encoder that compresses, encodes, and combines the second group of pitch and voicing parameters into a single parameter to create a second plurality of encoded data; and
- a multiplexer that multiplexes the first and second plurality of encoded data create a multiplexed signal for transmission, the multiplexed signal representing the voice message.

7. The very low bit rate channel encoding system according to claim 6 further comprising:

a receiver that receives the multiplexed signal, the receiver comprising:
- a de-multiplexer that demultiplexes the multiplexed signal to create a reproduction of the first and second plurality of encoded data;
- an inverse non-uniform root-mean-square scalar decoder that decompresses and decodes the first plurality of encoded data;
- an inverse three slope vector decoder that decompresses and decodes the second plurality of encoded data to recover the second group of pitch and voicing parameters from the single parameter; and
- a synthesizer that receives the first group of speech parameters and the second group of pitch and voicing parameters and synthesizes a reproduction of said speech parameters to replicate said voice message.

8. The very low bit rate channel encoding system according to claim 6, wherein the non-uniform root-mean-square scalar encoder operates to perform a discrete cosine transform on the first group of energy parameters resulting in a transformed first group of energy parameters, the non-uniform root-mean-square scalar encoder further comprising:

a non-uniform scalar quantizer that operates to quantize the transformed first group of energy parameters to create the first plurality of encoded data.

9. The very low bit rate channel encoding system according to claim 6, wherein the three slope vector encoder operates to:

assign an unvoiced frame to a first pitch value and a voiced frame to a second pitch value;

compare a pitch value of a subsequent frame to a pitch value of a prior frame to determine a pitch trend, the pitch trend comprising a constant pitch for a subsequent frame having a like pitch value, an increasing pitch for a subsequent frame having a greater pitch value, and a decreasing pitch for a subsequent frame having a lesser pitch value;

accumulate a number of like pitch trend frames until the pitch trend changes; map the pitch trend and the number of like pitch trend frames to a;segment variable; and encode the segment variable using a Huffman encoding procedure adapted for efficient coding of low bit rate voice messaging, until all data in the second group of pitch and voicing parameters has been coded.

* * * * *